United States Patent [19]
Koppel

[11] Patent Number: 5,531,067
[45] Date of Patent: Jul. 2, 1996

[54] OPTIMIZED SYSTEM FOR FEEDING A REIGNITABLE ROCKET ENGINE

[75] Inventor: Christophe Koppel, St. Denis, France

[73] Assignee: Societe Europeenne De Propulsion, Suresnes, France

[21] Appl. No.: 556,631

[22] Filed: Nov. 13, 1995

Related U.S. Application Data

[63] Continuation of Ser. No. 146,798, Nov. 1, 1993, abandoned.

[30] Foreign Application Priority Data

Nov. 4, 1992 [FR] France ........................ 92 13203

[51] Int. Cl.⁶ .................................................. F02K 9/44
[52] U.S. Cl. ............................................. 60/259; 60/734
[58] Field of Search ........................... 60/204, 240, 257, 60/258, 259, 734

[56] References Cited

U.S. PATENT DOCUMENTS

| | | | |
|---|---|---|---|
| 3,417,563 | 12/1968 | Loprete | 60/240 |
| 4,722,183 | 2/1988 | Rosen | 60/259 |
| 4,880,185 | 11/1989 | Apfel | 60/259 |
| 4,923,152 | 5/1990 | Barkats | 60/257 |
| 5,027,597 | 7/1991 | Soeffker | 60/259 |
| 5,071,093 | 12/1991 | Perdu | 244/135 |
| 5,116,000 | 5/1992 | Girard | 244/135 |

FOREIGN PATENT DOCUMENTS

| | | |
|---|---|---|
| 0434515 | 6/1991 | European Pat. Off. . |
| 0434509 | 6/1991 | European Pat. Off. . |
| 0113622 | 7/1984 | France . |
| 2636095 | 9/1988 | France . |

*Primary Examiner*—Louis J. Casaregola
*Attorney, Agent, or Firm*—Weingarten, Schurgin, Gagnebin & Hayes

[57] ABSTRACT

The present invention relates to a system for feeding the engines of a space vehicle with at least one liquid propellant, the system comprising for the purpose of storing said liquid propellant under a pressure greater than the feed pressure, firstly a main tank having no liquid expulsion device, and secondly an auxiliary tank that is smaller than the main tank and that is provided with a device for separating the liquid phase from the gas phase, switching means enabling the auxiliary tank to be selectively refilled with liquid propellant from the main tank; such that liquid propellant that is free from pressurization gas bubbles can always be delivered regardless of the flight conditions of the vehicle, and in particular when it is not possible to take said liquid propellant from the main tank.

8 Claims, 4 Drawing Sheets

OPTIMIZED SYSTEM FOR FEEDING A REIGNITABLE ROCKET ENGINE

This application is a continuation of application Ser. No. 08/146,798, filed Nov. 1, 1993 (now abandoned).

FIELD OF THE INVENTION

The present invention relates to an optimized system for feeding a reignitable rocket engine, and intended mainly for service or propulsion systems of space vehicles of all types, in particular satellites or launchers, that may be recoverable or otherwise.

PRIOR ART

In such applications, engines and other receivers are fed by liquids (and in particular propellant components) being expelled from one or more storage tanks by means of an inert pressurization gas. Nevertheless, since such feeds must be performed using propellant liquids that are free from gas, it is particularly difficult to collect such propellant liquids under conditions of weightlessness or of microgravity.

To satisfy this problem, devices already exist that are specifically designed to expel liquid and that are provided in tanks that are to operate in weightlessness. Such devices enable the liquid contained in the tank to be drawn off from wherever it may be within the tank, and they make use of surface tension forces which, under conditions of microgravity, become preponderant. Such forces entrain the liquid into zones where the walls are closer together and where the shapes of the liquid/gas interfaces are such as to have optimum area.

The tanks and the liquid expulsion devices (LEDs) that they contain may be of various different shapes, depending on the intended application, but they are always complex in structure and greatly overdimensioned.

One solution to this dimensioning problem is given by French patent application No. 2 655 943 which shows a storage system for use in the context of a two-liquid propellant assembly to store liquid propellant under pressure, with each liquid occupying a main capacity that leaves room for a small residual volume of pressurization gas, and an auxiliary capacity for gas that is in communication with said residual volume and that acts as an expansion vessel when the pressure in the main capacity increases. The main capacity is thus better dimensioned, but its internal structure remains complex, requiring an LED, and implementation thereof must be highly accurate and is difficult. This gives rise to very high cost that penalizes the overall feed system.

OBJECTS AND BRIEF SUMMARY OF THE INVENTION

An object of the present invention is to mitigate the above drawbacks and to provide a rocket engine feed system that enables a considerable cost reduction to be achieved without sacrificing overall performance of the system.

Another object of the invention is to enable different engines and receivers to be fed in succession regardless of the intensity, the sign, or the direction of the resultant of surface effects acting on the space vehicle, and with this applying in spite of the simplification provided in the structure of the feed system.

These objects are achieved by a system for feeding the engines of a space vehicle operating in weightlessness or in microgravity with at least one liquid propellant, the system comprising, for the purpose of storing said liquid propellant under a determined pressure that is greater than the engine feed pressure, firstly a main tank that does not include a liquid expulsion device or a liquid and gas phase separation device, and secondly an auxiliary tank of smaller size than the main tank and provided with a device for separating liquid and gas phases, switching means enabling the auxiliary tank to be selectively refilled with propellant from the main tank; such that it is always possible to feed liquid propellant that is free from pressurization gas bubbles regardless of the flight conditions of the vehicle, and in particular when it is not possible to take said liquid in bubble-free condition from the main tank.

The reductions in mass and in cost that are achieved by replacing main tanks provided with devices for separating the liquid phase from the gas phase by means of simple containers opens advantageous prospects for improving the competiveness of space vehicles. In addition, by refilling the auxiliary capacity, the switching means make it possible to reignite the engines on multiple occasions, which engines are connected so that they can always be fed from either of the capacities, as appropriate.

In a first embodiment, said switching means are disposed on a link connecting the outlet of the auxiliary tank to the outlet of the main tank, the main tank directly feeding a first series of load members and the auxiliary tank directly feeding a second series of load members. The switching means may be constituted by a tree-port valve. In this first embodiment, the feed method implemented comprises the following steps:

a) feeding the auxiliary engines from the auxiliary tank;

b) after a determined length of time, feeding the main engine from the main tank and extinguishing the auxiliary engines;

c) opening the switching means to enable the auxiliary tank to be filled;

d) after a determined length of time that is long enough to enable the auxiliary tank to be refilled, closing the switching means;

e) extinguishing the main engines; and f) if necessary, repeating steps a) to e) until the capacity of the main tank has been used up.

In another embodiment, said switching means are disposed at the outlet from the main tank, the set of load members being fed directly either from the auxiliary tank or from the main tank, once said members are activated, thus enabling the propellant liquids contained therein to be drawn off.

In this second embodiment, the feed method implemented comprises the following steps:

a) feeding the main engines from the auxiliary tank;

b) after a determined length of time, opening the switching means to enable both the main engines to be fed from the main tank and the auxiliary tank to be refilled from the main tank;

c) extinguishing the main engines and closing the switching means; and d) if necessary, repeating steps a) to c) until the capacity of the main tank has been used up.

Advantageously, the main and the auxiliary tanks are pressurized autonomously (blow-down pressurization).

Furthermore, the feed system may include a gas capacity for recharging the main tank after it has already been pressurized autonomously (by blow-down).

Thus, this additional structure makes it possible to increase the mission lifetime of a space vehicle fitted with said recharge without it being necessary to change the existing main tank. In addition, to being appropriately dimensioned from the start, this structure makes it possible, because of the higher pressure that exists in the recharge, to achieve considerable reduction in the total bulk of the apparatus.

The tanks are advantageously pressurized from a single common capacity containing an inert pressurization gas under high pressure.

In a variant embodiment, the auxiliary tank is pressurized directly from the main tank which is in turn pressurized autonomously (by blow-down).

BRIEF DESCRIPTION OF THE DRAWINGS

Other characteristic and advantages of the present invention appear more clearly on reading the following description given with reference to the accompanying drawings, in which.

DETAILED DESCRIPTION OF PARTICULAR EMBODIMENTS

Figure 1:
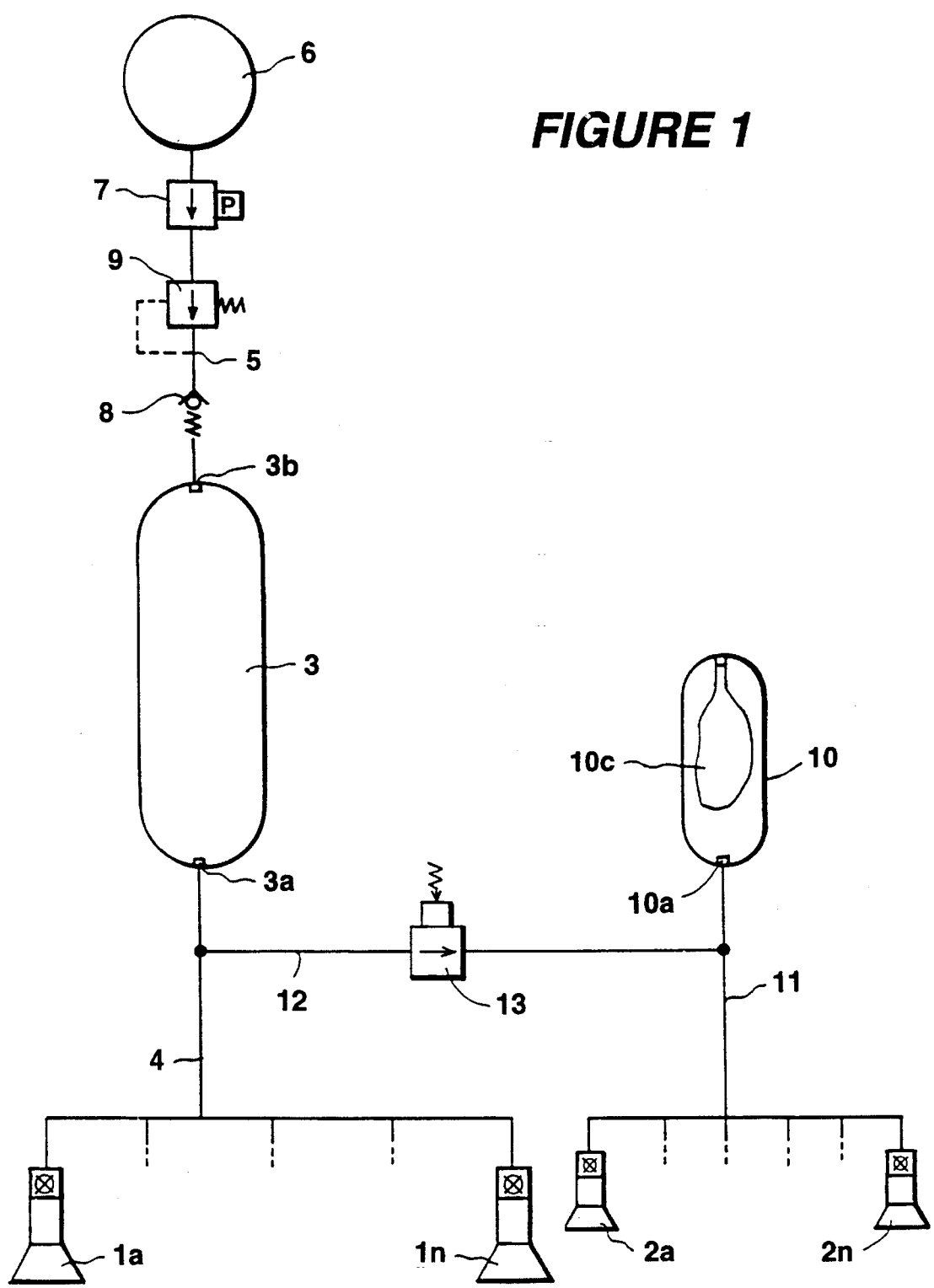
FIG. 1 shows a first embodiment of a rocket engine feed system of the invention.

FIG. 1 shows a first embodiment of a feed system of the invention. This embodiment serves to feed a plurality of load members 1a, ..., 1n; 2a, ..., 2n, such as the main and auxiliary thrust engines of a launcher, and it is applicable to various types of propellant, e.g. single component propellants such as hydrazine $N_2H_4$, "dual mode" hydrazine $N_2H_4$ and nitrogen peroxide $N_2O_4$ capable of operating either as a single-component propellant for controlling orbit or attitude or as a two-component propellant for apogee maneuvers, or two-component propellants such as monomethylhydrazine MMH and nitrogen peroxide $N_2O_4$. In the case of a two-component propellant, the circuits used by each of the two components are identical to those shown in FIG. 1.

A circuit for receiving a single-component propellant or one of the components in a two-component propellant comprises a main tank 3 constituted by a simple container having a metal wall of a thickness that is compatible with the propellant in question. This tank has no liquid expulsion device (LED) nor does it have any device for separating liquid from gas, which devices have been essential for operation in weightlessness or in microgravity prior to the teaching of the present invention. An outlet 3a of the main tank positioned as a function of the thrust direction of the first load members 1a to 1n is connected directly thereto via a main duct 4. An inlet 3b to the main tank situated opposite to its outlet 3a is connected via a gas inlet duct 5 to a pressurization gas capacity 6, said duct being provided with an isolating valve 7 that is advantageously pyrotechnical, and also with non-return means 8 and with a pressure regulator 9.

In addition to the main tank, the feed system includes an auxiliary tank 10 that is considerably smaller in size and that is provided, on the contrary, with a device for expelling liquid so as to be able to deliver a flow of liquid that is free from bubbles of gas. Nevertheless, this auxiliary tank is of much smaller capacity than the main tank, so its LED is small in size. Furthermore, it is advantageously constituted by a simple accumulator bag 10c or by a bellows, both of which devices are simple, reliable, and cheap. An outlet 10a of the auxiliary tank is connected directly via an auxiliary duct 11 to second load members 2a to 2n. Advantageously, the auxiliary tank 10 is initially partially filled with an inert gas under an appropriate pressure enabling it to have its own internal pressurization (known as a "blow-down" device).

In addition, a link 12 provided with switch means 13 serves to connect the outlet 3a of the main tank to the outlet 10a of the auxiliary tank.

Naturally, the person skilled in the art will be competent to complete the above disposition with safety devices, sensors, and various valves for filling and emptying that are required when implementing the above device whose operation is described below.

In the course of its mission, a third stage of a launcher or a satellite, for example, may be required to operate in weightlessness. Under such circumstances, the liquid contained in its tanks may be located anywhere within the tanks, which generally means that surface tension devices are required to cause the free surface of the liquid to take up a known location, thus requiring a large number of tapping points or else a considerable reduction in strainer sheets for imprisoning liquid that is free from bubbles of gas.

In the present example, the main tank 3 of the feed system of the invention has no such device and under certain flight conditions, when the main duct 4 is fed with the pressurization gas, this could lead to undesirable operating conditions. Thus, when it is not possible to draw liquid off from the main tank, feed is applied only to some of the second load members 2a to 2n which are fed from the auxiliary tank which, since it is provided with an LED device for separating the liquid and gas phases, is capable of being actuated regardless of the magnitude, the sign, and the direction of the resultant of the surface forces acting on the system. Feeding only those second load members that point in substantially the same direction as the first load members 1a to 1n, serves to urge the liquid contained in the main tank against its outlet 3a, thereby subsequently enabling the first load members to be fed directly from the main tank after a determined time delay.

In parallel, by opening the switching means 13 for a determined length of time, it is possible to refill the auxiliary tank with liquid taken from the main tank.

The above steps may be repeated several times throughout a mission so long as liquid remains available in the main tank, and advantageously up to more than 99% of the total capacity of the tank can be used. The switching means 13 are preferably constituted by an electrically controlled valve which is opened for a sufficient length of time while the first load members are being fed from the main tank.

It may be observed that the valve 13 may be a three-port valve so as to enable three families of load members to be fed.

Figure 2:
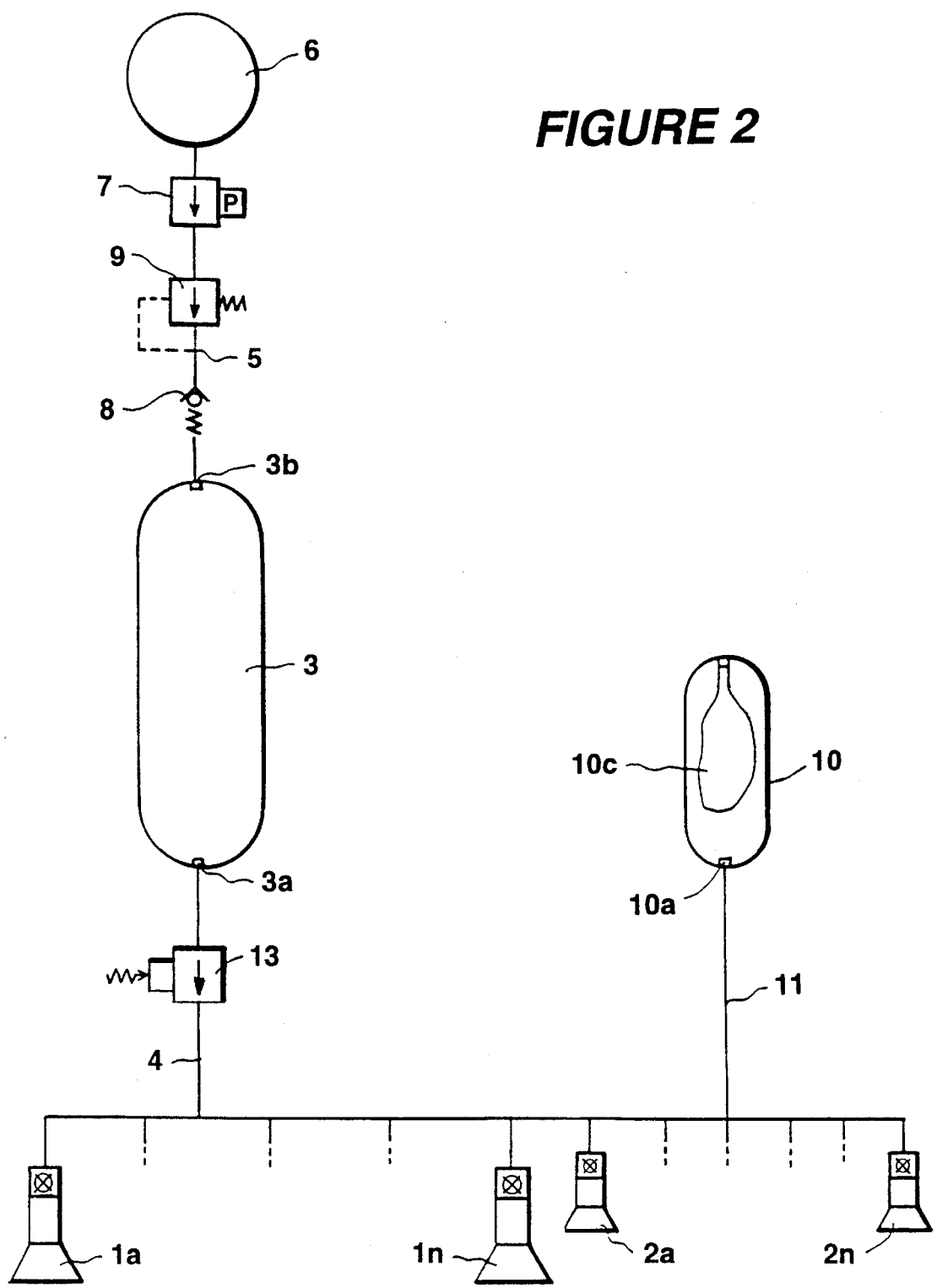
FIG. 2 shows a second embodiment of a rocket engine feed system of the invention.

FIG. 2 shows a second embodiment of a feed system in which the set of load members is fed simultaneously from a main tank and from an auxiliary tank.

The elements present in this embodiment that have already been described above are given the same reference numerals. The main tank 3 is pressurized from a pressurization gas capacity 6 via an expander 9, non-return means 8, and a pyrotechnical isolating valve 7. The outlet 3a of this tank is now connected via the main duct 4 to all of the load members 1a to 1n and 2a to 2n, and the switching means 13 are placed directly on the outlet from the main tank 3. Similarly, the outlet 10a from the auxiliary tank is likewise directly connected via the auxiliary duct 11 to all of the load members.

As before, the main tank 3 has no liquid expulsion device, i.e. is has no sheet or other device that makes use of capillarity forces or forces relating to surface tension that are difficult to implement because of the cleanliness requirements of such a device that give rise to very considerable cost, nor does it require any piston, bellows, bag, or membrane that give rise to considerable mass and difficulties of implementation when implemented on the scale of a "large" tank, which difficulties are of the same general order of magnitude and have a further damaging effect on cost.

As before, the auxiliary tank 10 is self-pressurized (by blow-down).

The system operates as follows, assuming that it is not possible, initially, to feed the load members from the main tank.

The first load members are therefore fed from the auxiliary tank only, within which tank the surface of the liquid is accurately located, and this has the effect of urging the liquid in the main tank against the outlet 3a therefrom. Thereafter, liquid can be drawn from the main tank to feed all of the load members, providing the switching means 13 on the outlet from the main tank are open. Given the connection that exists between the load members and each of the tanks, one of the effects of feeding the load members from the main tank is to refill the auxiliary tank in parallel.

Figure 3:
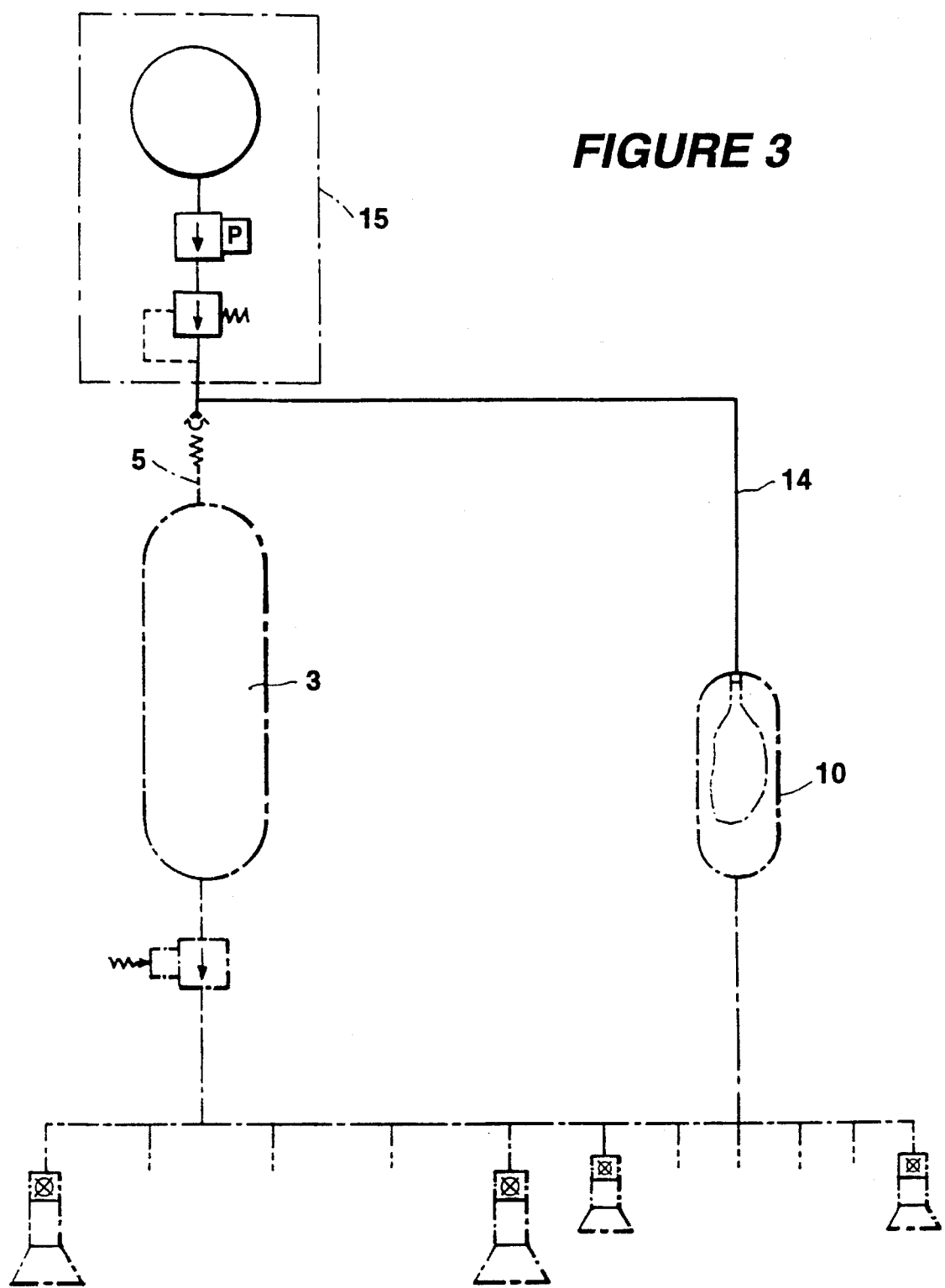
FIG. 3 shows a variant applicable to the embodiments of FIGS. 1 and 2.

FIG. 3 shows a variant relating to the pressurization of the auxiliary tank 10 which is now pressurized from the pressurization source 15 via a duct 14 extending in parallel with the duct 5 that feeds the main tank 3. This single pressurization source 15 thus serves both to pressurize the main tank and to pressurize the auxiliary tank. This disposition is equally applicable to the first embodiment shown in FIG. 1 as to the second embodiment shown in FIG. 2 (the only embodiment shown in FIG. 3, by way of example).

In another variant, the main tank 3 is pressurized autonomously (blow-down) and the pressurization source 15 then constitutes a capacity for refilling only the main tank with pressurization gas, since the auxiliary tank 10 is likewise provided with its own internal pressurization.

Such a disposition is particularly advantageous in the context of existing devices since it enables the capacity of the feed system to be increased without altering a tank that has already been installed. Furthermore, because of the greater pressure that exists in the recharge capacity, the general bulk of the feed system can also be reduced, at the design stage, relative to a system comprising only a self-pressurized tank assembly.

In yet another variant, there is no external pressurization source or recharging capacity, with the main tank 3 being pressurized internally as is the auxiliary tank 10. After feeding the first or the second load members, the auxiliary tank is repressurized by the compression that is achieved by injecting liquid from the main tank during the period of time that the switching valve 13 is open, with the pressures that exist in the tanks reaching equilibrium by the end of said period. This period may be previously determined as a function of flow rate demands and as a function of the pressures present in each of the tanks.

Figure 4:
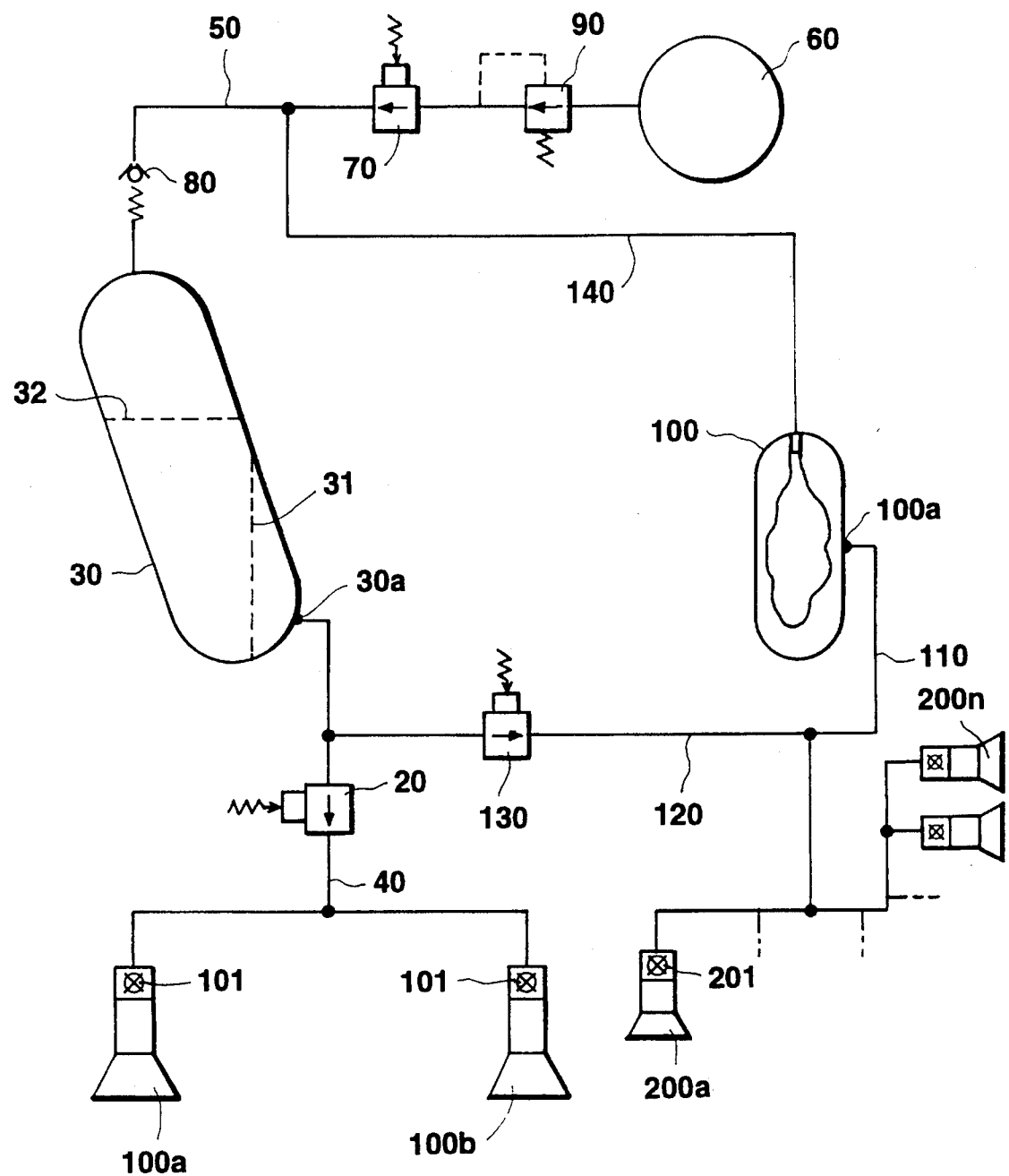
FIG. 4 shows another embodiment of a feed system of the invention implemented in the context of a satellite propulsion assembly.

FIG. 4 shows an application of the feed system of the invention to a geostationary satellite.

As before, this system comprises a main tank 30 and an auxiliary tank 100 whose external pressurization is provided in common by means of a pressurization gas capacity 60. The main tank for feeding propellant to the engine during the lifetime of the satellite is inclined and has an outlet point 30a that is disposed in conventional manner so that the propellant is made available while free from bubbles of gas. Similarly, and in conventional manner, a satellite includes at least one apogee engine 100a, 100b and attitude and orbit controlling engines 200a to 200n. The apogee engine(s) is/are directly connected to the main tank 30 via respective injection valves 101 and 201 and via a common isolating valve 20, while the small engines are connected to the auxiliary tank 100.

A duct 120 having a switching valve 130 placed thereon interconnects the propellant outlet points 30a and 100a of the two tanks. Dashed lines 31 and 32 show the free surface of the propellant contained in the main tank respectively when the apogee engine(s) is/are in operation and when the engines used for controlling the attitude and the orbit of the satellite are in operation in a south maneuver.

Conventionally, the main tank has a volume of about 1,000 dm$^3$ (the tank may be built up from a plurality of smaller-volume tanks), and the auxiliary tank may be dimensioned to have a payload of 1 dm$^3$ to 2 dm$^3$ (total volume 2 dm$^3$ to 4 dm$^3$), which volume suffices for performing at least one north/south maneuver. The volume of the pressurization capacity is about 80 dm$^3$. The pressures used may be about 2 MPa in each tank and 25 MPa in the pressurization capacity.

To reduce non-consumables, the main tank may be provided with anti-shaking devices, thereby improving the overall efficiency of the system.

The operation of the feed system is described for a typical example of satellite displacement, i.e. during an apogee maneuver followed by maneuvers for controlling orbit and attitude.

Operation takes place as follows, assuming that the main tanks and the auxiliary tanks have initially been filled with propellant liquids on the ground or during operation of the earlier stages.

For the apogee maneuver:

After the weightless stage of transfer into a geostationary orbit, the propellant liquids are available (without bubbles of gas) only from the auxiliary tanks 100. Thus, operation of the apogee engine is preceded by operation of the orbit control or attitude engines for thrusting the propellant liquids against their respective main tanks.

The switching valves 130 are initially closed, and the following steps are performed:

a) the attitude engines are operated to urge the propellant liquids to one end of their respective tanks so as to have a free surface of each propellant liquid such as the surface 32;

b) after a length of time that is determined as a function of shaking in the main tanks (about 1 second), the apogee engine is put into operation and the attitude engines are extinguished;

c) the switching valves are opened so as to refill the auxiliary tanks;

d) after a length of time that is determined to ensure that the auxiliary tanks have been filled, the switching valves are closed;

e) the apogee engine is extinguished; and f) steps a) to e) can then be repeated with the apogee engine being reignited.

For an orbit-correcting maneuver:

If north/south drift always takes place in the same direction (e.g. to the north) then the successive steps performed are as follows, the switching valves initially being closed:

a) the "thrust towards the south" engines are operated to urge the propellant liquids towards respective ends of the main tanks;

b) after a length of time has elapsed that is determined as a function of shaking in the main tanks (about 1 second), the switching valves are opened;

c) the propellant liquids from the main tanks are fed directly to the engines that are in operation and they also serve to fill the auxiliary tanks that include phase separation means; and d) at the end of "thrust towards the south" engine operation, the injection valves and the switching valves are closed simultaneously.

For an attitude-correcting maneuver:

The feed to the engines used comes solely from the auxiliary tanks that are provided with phase separation devices (LEDs). The amplitude of the maneuvers is thus limited by the capacity of the auxiliary tanks, but consumption during such maneuvers always turns out to be very low.

Nevertheless, should it ever be necessary to "refill" the auxiliary tanks, it is possible to perform an orbit control cycle as follows, assuming the switching valves to be closed initially:

a) the "thrust towards the south" engines are operated to urge the propellant liquids towards one end of their main tanks;

b) after a length of time that is determined as a function of shaking in the main tanks (about 1 second), the switching valves are opened;

c) the propellant liquids from the main tanks are then fed directly to the engines that are in operation, and simultaneously the auxiliary tank having phase separation means are refilled; and d) after a determined length of time, the injection valves and the switching valves are closed simultaneously.

I claim:

1. A system for feeding the engines of a space vehicle operating in weightlessness or in microgravity with at least one liquid propellant, the system comprising, for the purpose of storing said liquid propellant under a determined pressure of a gas that is greater than the engine feed pressure, a main tank having an outlet and that does not include any device that keeps the main tank outlet covered with liquid whenever outflow is demanded, said main tank oriented in a predetermined attitude such that propellant covers said main tank outlet when said space vehicle accelerates in response to thrust from a load member, and an auxiliary tank of smaller size than the main tank and provided with liquid propellant under pressure of a gas that is greater than the engine feed pressure said auxiliary tank having an outlet and including a device operative to keep the auxiliary tank outlet covered with liquid whenever outflow is demanded, switching means enabling the auxiliary tank to be selectively refilled with propellant from the main tank when the flight conditions of the vehicle due to the thrust orientation are such that the outlet of the main tank is covered by propellant; such that it is always possible to feed a set of load members of liquid propellant that is free from pressurization gas bubbles regardless of the flight conditions of the vehicle, and in particular when it is not possible to take said liquid propellant in bubble-free condition from the main tank.

2. A feed system according to claim 1, wherein said switching means are disposed on a link connecting the outlet of the auxiliary tank to the outlet of the main tank, the main tank directly feeding a first series of load members and the auxiliary tank directly feeding a second series of load members.

3. A feed system according to claim 2, wherein the switching means are constituted by a three-port valve.

4. A feed system according to claim 1, wherein said switching means are disposed at the outlet from the main tank, the set of load members being fed directly either from the auxiliary tank or from the main tank, once said members are activated, thus enabling the propellant liquids contained therein to be drawn off.

5. A feed system according to claim 1, wherein at least one of the main tank and the auxiliary tank are further connected to a pressurized gas supply.

6. A feed system according to claim 1, wherein at least one of the main tank and the auxiliary tank are pressurized with a pressurized gas provided by a supply through a pressure regulator.

7. A feed system according to claim 1, wherein the auxiliary tank is pressurized directly from the main tank which is itself pressurized without an external source.

8. A feed system according to claim 1, wherein the main tank and the auxiliary tank are pressurized with a pressurized gas provided by a common supply through a pressure regulator.

* * * * *